United States Patent [19]

De Shon

[11] Patent Number: 4,865,723
[45] Date of Patent: Sep. 12, 1989

[54] BUOYANCY POWERED DESALINIZATION PLANT

[76] Inventor: Dennis A. De Shon, P.O. Box 3255, Baton Rouge, La. 70821

[21] Appl. No.: 264,634

[22] Filed: Oct. 31, 1988

Related U.S. Application Data

[63] Continuation-in-part of Ser. No. 134,824, Dec. 18, 1987, abandoned.

[51] Int. Cl.$^4$ .............................................. B01D 5/00
[52] U.S. Cl. ................................... 210/104; 210/149; 210/170; 202/234; 203/49; 203/DIG. 20
[58] Field of Search ..................... 210/104, 141–143, 210/149, 170, 180, 242.1, 251; 203/10, 49, DIG. 20; 202/234

[56] References Cited

U.S. PATENT DOCUMENTS

| | | | |
|---|---|---|---|
| 4,335,576 | 6/1982 | Hopfe | 203/10 X |
| 4,473,473 | 9/1984 | Cheng | 203/10 X |
| 4,504,362 | 3/1985 | Kruse | 202/234 X |
| 4,618,421 | 10/1986 | Kanton | 210/170 |
| 4,683,720 | 8/1987 | De Shon | 60/496 |
| 4,713,937 | 12/1987 | De Shon | 60/495 |
| 4,742,242 | 5/1988 | De Shon | 240/54 |

*Primary Examiner*—Tom Wyse

[57] ABSTRACT

Air holding spaces are incorporated into a ring attached by arms to a driveshaft supported on sealed bearings in a vessel containing saline water. Air compressed by a blower or air compressor, powered by external power (i.e. prime mover), is injected into the air holding spaces by injectors. The spaces ascend due to their buoyancy, imparting a rotary motion to the driveshaft. Energy developed is transmitted through the driveshaft to an electric generator powering the system control computer, sensors and valves. Energy is also used to rotate a water pump which draws in saline water and pumps it to a saline water tank at the top of the vessel, where it circulates through an array of water holding tubes of thermally conductive material. Heat generated by the compression of the injected air is conducted to the saline water. This heat and the molecular agitation of the water by the ascending air causes the water molecules at the surface to evaporate into the vapor state. Heat is conducted from the vapor, through the conductive tubes, into the saline water. The air, having lost this heat, gives up liquid water, which condenses on the tube surfaces, and falls into a fresh water holding tank. Saline water is delivered to the vessel to maintain water level. Salts are removed by periodic partial draining. All input and output is controlled by a system control computer programmed with the operating parameters, and which receives real-time input from a series of sensors within the system.

1 Claim, 2 Drawing Sheets

BUOYANCY POWERED DESALINIZATION PLANT

This application is a Continuation-in-Part of Ser. No. 07/134,824, filed 12/18/87, abandoned.

BACKGROUND OF THE INVENTION

1. Field of the Invention

This invention relates generally to apparatus for removing the salt from sea water to produce potable water, and more specifically to apparatus of this character utilizing the buoyancy of a gas, in this case air, injected into a ring attached to a driveshaft.

2. Description of the Prior Art

There have been various devices that have been proposed for producing potable water from sea water without the consumption of fossil fuels, but these have not proven to be satisfactory.

SUMMARY OF THE INVENTION

The invention comprises a plurality of air holding spaces incorporated into a ring attached by arms to a driveshaft which is supported on sealed bearings in the walls of a vessel containing saline water. A gas, in this case air, is compressed to high pressure by a blower or compressor driven by an external power source (i.e. prime mover), and injected into the air holding spaces by computer controlled injectors at the base of the ring. It is also envisioned that this injection can alternatively be accomplished through ducting the compressed air along the axis of the axle, and into injectors at the roots of the air holding spaces.

The computer is programmed with the volume of air to be injected into each air holding space, and a sensor adjacent to the injector triggers air injection as each air holding space is positioned for injection. The air holding spaces, injected with air, ascend due to their relative buoyancy, imparting a rotary motion to the driveshaft. The ring is sized to capitalize on the expansion of the air (air expands to two hundred percent of injected volume ascending through thirtythree feet of water), as it ascends in the vessel. The development of power through Buoyant means has been recognized in U.S. Pat. Nos. 4,742,242, 4,713,937, and 4,683,720. The design of the air holding spaces allows air to be injected at the 160 degree position, maximizing the time that injected air is contained, increasing the total torque of the system. The air holding spaces are designed of sufficient volume so that they may be partially filled by the injectors, yet contain the total volume of the air as it expands during its ascent through the liquid, expelling the liquid, and providing additional lift. The air exits the air holding spaces as the root of each reaches the 360 degree position. The center of buoyant lift of the air holding spaces is positioned at a distance from the driveshaft pivot point, so as to increase the moment arm and the torque produced. The ring and arms are sheathed in a hydrodynamically styled skin to reduce system friction. Energy developed by the ring is transmitted through the driveshaft, to rotate a water pump and an electric generator which are attached to the driveshaft. The generator produces power for collateral system functions of powering the system control computer, sensors and valves, but does not power the air compressor. The water pump draws in saline water and pumps it to the saline water tank at the top of the vessel, where it circulates through an array of saline water holding tubes which are constructed of a thermally conductive material. The air injected into the vessel is heated to a great degree as it is compressed by the blower or compressor. As an example, atmospheric air compressed to 15 psig is injected at a temperature of approximately 300 degrees Fahrenheit.

The heat contained in the injected air is conducted to the water during the ascent of the air through the vessel, heating the water and causing molecular agitation which causes the water molecules at the surface to break away and evaporate into the vapor state. The vapor flows through the air duct in the vessel wall and through the array of saline water holding tubes, where the heat is conducted from the vapor, through the conductive tubes, and into the saline water. The air, having lost this heat, gives up its water content, which condenses on the tube surfaces, and falls into the fresh water holding tank. Air having passed through the tube array exits the vessel through the air exhaust port. The saline water in the tubes and tank is delivered, by the vessel filling pipe, to the vessel in which the ring is mounted in order to maintain the water level. Salts and other solids which remain as the evaporation process proceeds all toward the base of the vessel. These are removed by periodic partial draining through a brine discharge pipe. All input and output is controlled by a system control computer which is programmed with the operating parameters, and which receives real-time input from a series of sensors within the system. All components which are exposed to saline water are fabricated of corrosion resistant materials.

OBJECTS AND ADVANTAGES OF THE INVENTION

It is an object of the invention to provide a water desalinization unit of this character which capitalizes on the buoyant power produced by capturing injected compressed air in the air holding spaces of a rotable ring to provide power for internal systems of computer control, sensors, valves and water pump. This generated buoyant power is not used to compress the air injected into the system.

It is another object of the invention to provide apparatus of this character that is simple in construction and operation.

It is a further object of the invention to provide apparatus of this character that is relatively inexpensive to manufacture and maintain.

The characteristics and advantages of the invention are further sufficiently referred to in connection with the following detailed description of the accompanying drawings, which represent one embodiment.

After considering this example, skilled persons will understand that many variations may be made without departing from the principles disclosed and I contemplate the employment of any structure, arrangements or modes of operation that are properly within the scope of the appended claims.

BRIEF DESCRIPTION OF THE DRAWINGS

Referring to the drawings which are for illustrative purposes only.

DESCRIPTION OF THE PREFERRED EMBODIMENT

Figure 1:
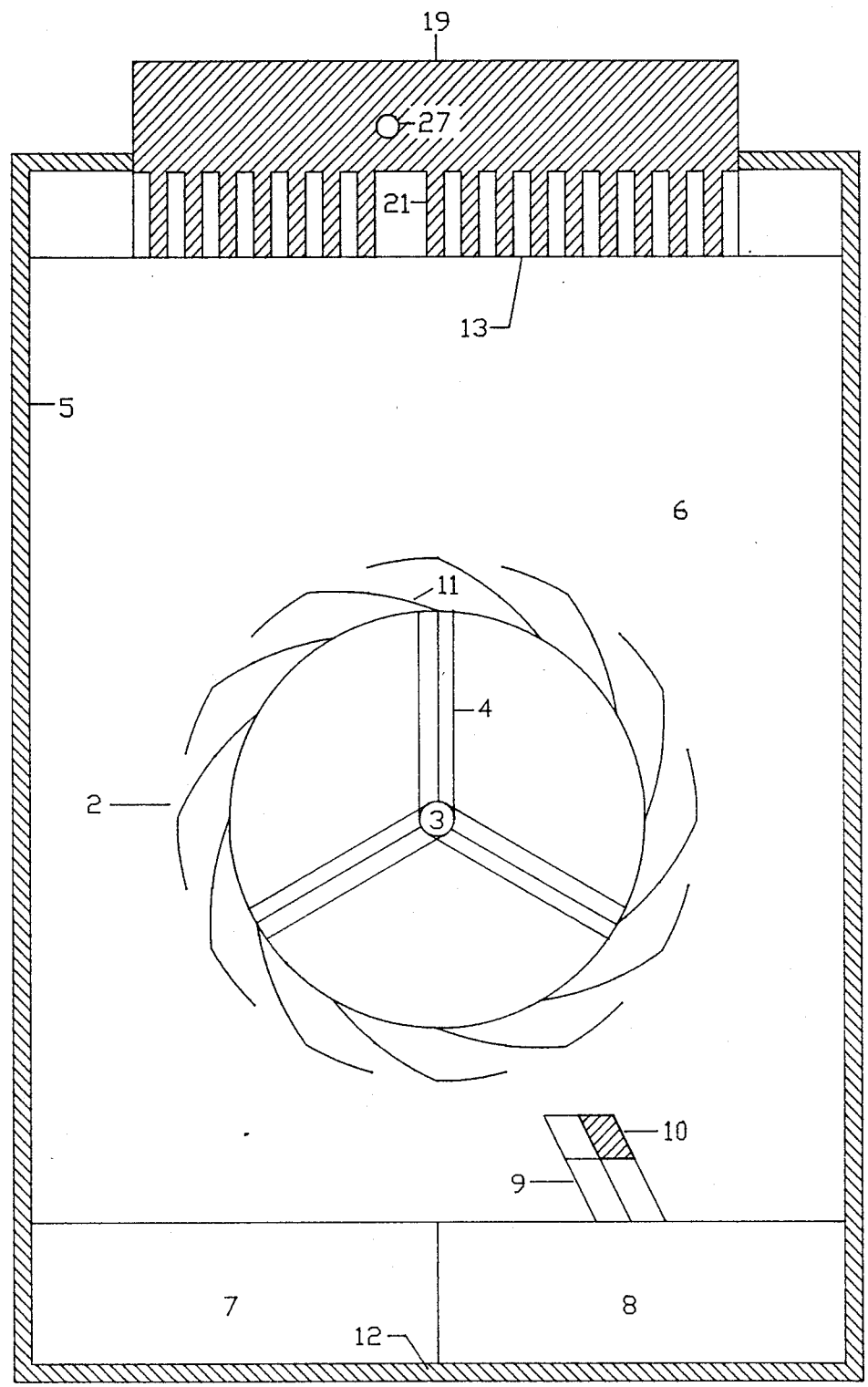
FIG. 1 is a schematic view of apparatus embodying the present invention, cross sectioned to show the air holding spaces incorporated in the ring which is attached to the driveshaft by the arms, and the saline water tube array.

Referring to the drawings, in FIG. 1, there is shown apparatus embodying the present invention. A plurality of air holding spaces (1) are incorporated in a ring (2) which is connected to a driveshaft (3) by arms (4). The apparatus is immersed in a vessel (5) containing saline water (6). A gas, in this case air, is compressed to high pressure by an externally powered blower or air compressor (7), metered by the system control computer (8), and injected into the air holding spaces, in such volume as is containable by the air holding spaces as the air expands during ascent, by the air injectors (9) as each air holding space reaches its 160 degree position. The system control computer is programmed with the volume of air to be injected into each air holding space, and an injection sensor (10) adjacent to the injectors triggers air injection as each air holding space is in injection position. The air is contained in the air holding spaces, its buoyancy causing the ring to rotate upward, providing rotary power through the driveshaft. As the root (11) of each air holding space reaches the 360 degree position, the contained air is released through the rear of the air holding space. The vessel sits on a base (12), and has a duct (13) through which air, having passed through the surface of the water, is routed.

Figure 2:
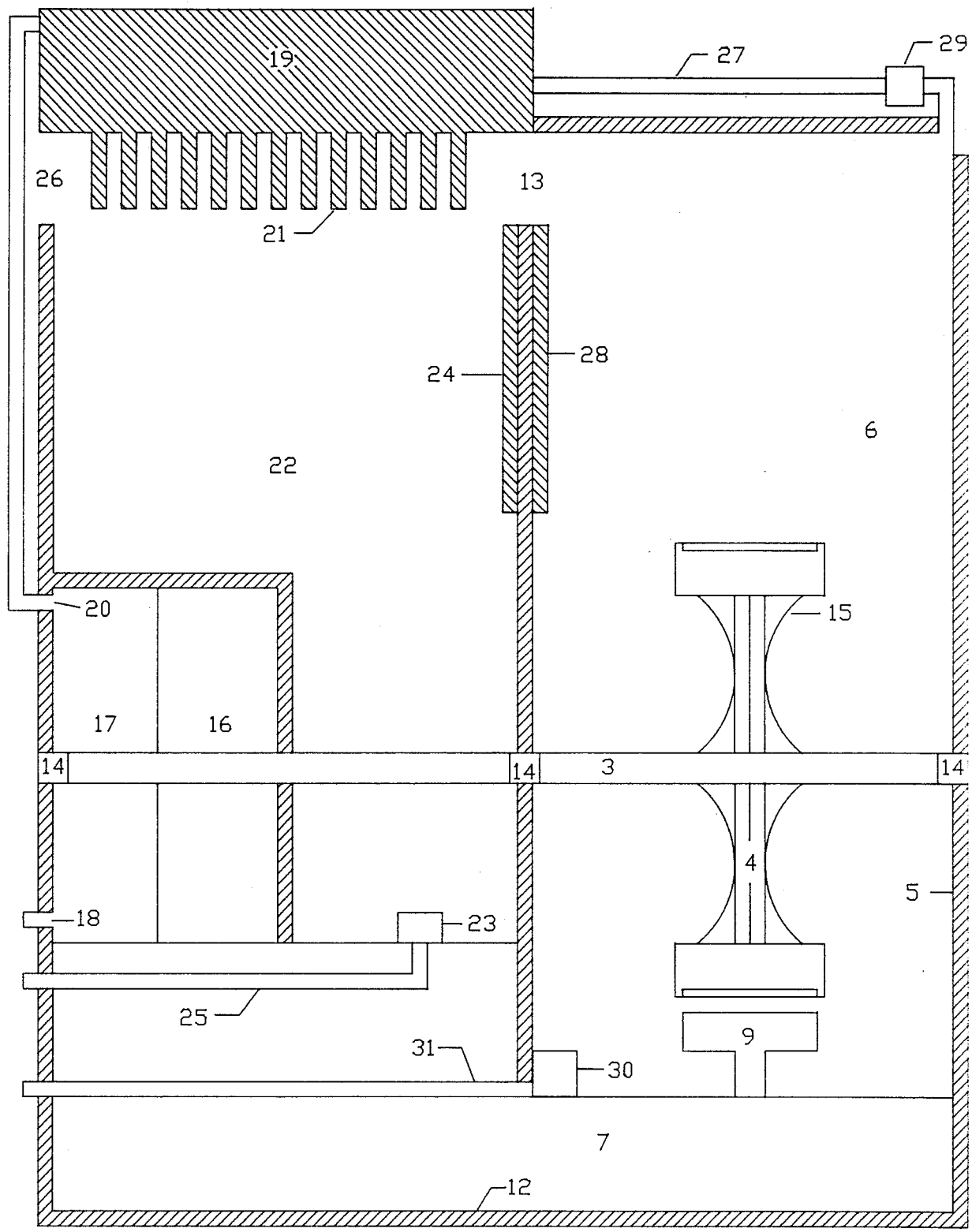
FIG. 2 is a cross sectional schematic side view of apparatus embodying the present invention, with the vessel walls cross-sectioned to show the sealed bearings, and routing of the various input and output systems.

Referring to FIG. 2, the driveshaft is supported within the vessel on sealed bearings (14). The ring and arms are sheathed in a hydrodynamically styled skin (15) to reduce system friction. Energy developed is transmitted through the driveshaft, producing power to rotate the electric generator (16) used to power internal systems functions other than air compression, and to rotate the water pump (17). The water pump draws in saline water from the sea through its saline water inlet (18) and pumps it to the saline water tank (19) at the top of the vessel, via the saline tank feeder pipe (20), where it is circulated through the array of saline water holding tubes (21) which are constructed of a thermally conductive material. The air injected into the vessel gains heat as it is compressed to high pressure by the compressor. This heat is conducted to the saline water in the vessel as the air ascends through the vessel. The water surface molecules, agitated by the addition of heat of the air passing through them, break away and evaporate into the vapor state. The vapor flows through the duct (13) in the vessel wall and through the array of saline water holding tubes (21), where the heat is conducted away from the water vapor, through the conductive tubes, and into the saline water contained in the tubes and the tank. The air, having lost this heat, gives up much of its water content in condensation on the tubes, and which water falls into the fresh water holding tank (22). It is drained from the holding tank by computer actuation of the fresh water output valve (23), as a result of real-time input into the system control computer by the fresh water level sensor (24) mounted on the wall of the fresh water holding tank. Water drains through the fresh water output valve into the fresh water output pipe (25) and to the desired use. Air having passed through the array of saline water holding tubes passes out of the vessel through the air exhaust port (26). The saline water contained in the tubes and in the saline water tank is delivered by the vessel filling pipe (27) to maintain the water level in the vessel. The saline water level sensor (28), mounted on the vessel wall, provides real-time input to the system control computer, which actuates the vessel filling valve (29) to maintain the level dictated by the computer program. As the evaporation process proceeds, salts and other solids remaining as the fresh water evaporates fall toward the bottom of the vessel. These are removed by periodic partial draining dictated by the computer program. The program actuates the brine discharge valve (30) which allows brine drainoff through the brine discharge pipe (31).

The invention and its attendant advantages will be understood from the foregoing description and it will be apparent that various changes may be made in the form, construction and arrangement of the parts without departing from the spirit or scope thereof or sacrificing its material advantages, the arrangement hereinbefore being merely by way of example; and I do not wish to be restricted to the specific form shown or uses mentioned except as defined in the accompanying claims.

I claim:

1. A buoyancy powered desalinization plant utilizing highly compressed gas, in this case air, injected into a ring immersed in a vessel containing saline water, comprising:

said ring attached to the extreme ends of arms radially connected to a driveshaft, said ring positioned at a distance from the driveshaft pivot point so as to increase the moment arm and the torque produced, said ring of a size which capitalizes on the expansion of the injected air during its ascent in the liquid, said ring and arms sheathed in a hydrodynamically styled skin, said driveshaft rotably mounted on sealed bearings in said vessel, and which is rotated by the upward motion of the ring resulting from the buoyant force of the air contained in a plurality of air holding spaces, air injectors positioned to inject air into the air holding spaces as each reaches the injection position, said air holding spaces designed of sufficient volume to contain the injected air as it expands during its ascent, said air holding spaces designed to maximize the duration which injected air is contained within them, and to exhaust the air as the root of each air holding space reaches the 360 degree position-the top of the lifting arc, said vessel sitting on a base, and having a duct at its top through which air passes, and an air exhaust port through which air exits the vessel, said vessel incorporating a fresh water holding tank, an air compressor or blower, powered by external power (i.e. prime mover), to highly compress air to be injected by the air injectors into the air holding spaces, said air compressor having a system control computer to meter the volume of air to be injected, said system control computer programmed with an operating program which includes the volume of air to be injected into each of the air holding spaces and with the operating parameters of the system, and which is also connected to valves and sensors which provide real-time input to the operating program, said sensors including an injection sensor, adjacent to the injectors, which triggers the computer controlled air injection as each air holding space reaches its injection position, said sensors including a fresh water level sensor mounted on the wall of said fresh water holding tank, and which provides real-time input of fresh water level to the system control computer, said fresh water holding tank having a fresh water output valve which is actuated by the system control computer, and which allows drainage of fresh water through a fresh water output pipe, said sensors including a saline water level sensor mounted on the wall of the vessel adjacent to said ring, which sensor providing real-time input of saline water level to the system control computer, said vessel having a brine discharge valve at its base which is actuated by the system control computer to drain off brine through a brine discharge pipe, a water pump attached to the driveshaft, which draws in saline water from the sea through a saline water inlet and pumps it via a saline tank feeder pipe to a saline water tank, an electric generator attached to the driveshaft, which produces electric power for internal systems operation of the system control computer, valves and sensors, but not for input air compression, from the rotation of the driveshaft, said saline water tank constructed with an array of thermally conductive saline water holding tubes at its bottom, said saline water tank connected by a vessel filling pipe to the vessel in which the ring is disposed, said vessel filling pipe having a vessel filling valve which is actuated by the system control computer to maintain the saline water level in the vessel.

* * * * *